(12) United States Patent
Camp et al.

(10) Patent No.: US 10,907,980 B2
(45) Date of Patent: Feb. 2, 2021

(54) METHOD AND APPARATUS FOR DETECTING FALSE POSITIVE SLIPPERY ROAD REPORTS USING MAPPING DATA

(71) Applicant: HERE GLOBAL B.V., Eindhoven (NL)

(72) Inventors: Robert Camp, Winfield, IL (US); Leon Stenneth, Chicago, IL (US); Alex Averbuch, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 203 days.

(21) Appl. No.: 15/675,414

(22) Filed: Aug. 11, 2017

(65) Prior Publication Data

US 2019/0049256 A1  Feb. 14, 2019

(51) Int. Cl.
*G01C 21/34* (2006.01)
*B60W 40/068* (2012.01)
*G01C 21/36* (2006.01)
*B60W 40/064* (2012.01)

(52) U.S. Cl.
CPC ....... *G01C 21/3453* (2013.01); *B60W 40/064* (2013.01); *B60W 40/068* (2013.01); *G01C 21/3691* (2013.01); *G01C 21/3697* (2013.01)

(58) Field of Classification Search
CPC combination set(s) only.
See application file for complete search history.

(56) References Cited

U.S. PATENT DOCUMENTS

| 5,699,056 | A  | * | 12/1997 | Yoshida ........... G08G 1/20 340/905 |
| 7,421,334 | B2 |   | 9/2008  | Dahlgren et al. |
| 9,154,909 | B2 |   | 10/2015 | Fulger et al. |
| 9,858,829 | B1 | * | 1/2018  | Brooks ............ G09B 9/042 |

(Continued)

FOREIGN PATENT DOCUMENTS

| CN | 202615565 U | * | 12/2012 |
| DE | 102014201564 A1 | | 7/2015 |

(Continued)

OTHER PUBLICATIONS

Dnriquez Denrie Jr et al: On Software-based Remote Vehicle Monitoring for Detection and Mapping of Slippery Road Sections vol. 15, No. 3, Jul. 22, 2016, pp. 141-154. (Year: 2016).*

(Continued)

*Primary Examiner* — Redhwan K Mawari
(74) *Attorney, Agent, or Firm* — Ditthavong & Steiner, P.C.

(57) ABSTRACT

An approach is provided for detecting false positive slippery road reports. For example, the approach involves receiving a slippery road report from a vehicle. The slippery road report, for instance, indicates that a slippery road event is detected at a location based on sensor information collected by the vehicle. The approach also involves map matching the location of the slippery road report to the mapping data to evaluate a proximity of the location to at least one geographic feature that is designated as an area where driver behavior is expected to be at least one cause of the slippery (Continued)

road event. The approach further involves classifying the slippery road report as the slippery road false positive report based on the evaluation.

20 Claims, 12 Drawing Sheets

(56) References Cited

U.S. PATENT DOCUMENTS

| | | | | |
|---|---|---|---|---|
| 2004/0015291 | A1* | 1/2004 | Petzold | G01C 21/3484 |
| | | | | 701/424 |
| 2008/0129541 | A1* | 6/2008 | Lu | G06K 9/00791 |
| | | | | 340/905 |
| 2008/0252487 | A1* | 10/2008 | McClellan | G01S 5/0027 |
| | | | | 340/936 |
| 2009/0138136 | A1* | 5/2009 | Natsume | H04L 12/40006 |
| | | | | 701/1 |
| 2010/0207751 | A1* | 8/2010 | Follmer | G01C 21/32 |
| | | | | 340/439 |
| 2011/0313656 | A1* | 12/2011 | Mignen | G01C 21/26 |
| | | | | 701/420 |
| 2014/0303806 | A1 | 10/2014 | Bai et al. | |
| 2015/0057891 | A1* | 2/2015 | Mudalige | B60W 10/00 |
| | | | | 701/42 |
| 2015/0266455 | A1* | 9/2015 | Wilson | B60W 30/10 |
| | | | | 701/93 |
| 2016/0057335 | A1* | 2/2016 | Pisz | H04N 5/23206 |
| | | | | 348/149 |
| 2016/0121904 | A1* | 5/2016 | Prakah-Asante | B60W 50/00 |
| | | | | 701/1 |
| 2018/0029612 | A1* | 2/2018 | Tsuyunashi | B60W 30/095 |
| 2018/0089994 | A1* | 3/2018 | Dhondse | G08G 1/0145 |
| 2018/0126901 | A1* | 5/2018 | Levkova | B60Q 9/00 |
| 2018/0130354 | A1* | 5/2018 | Bender | G08G 1/166 |
| 2018/0174451 | A1* | 6/2018 | Rao | G05D 1/0088 |
| 2018/0257655 | A1* | 9/2018 | Westover | B60W 30/18109 |
| 2019/0049256 | A1* | 2/2019 | Camp | B60W 40/064 |
| 2019/0189008 | A1* | 6/2019 | Langona | G08G 1/0141 |

FOREIGN PATENT DOCUMENTS

| | | | | |
|---|---|---|---|---|
| DE | 102015201383 | A1 | 7/2016 | |
| EP | 3 037 314 | A1 * | 6/2016 | B60W 40/068 |
| JP | 2009277146 | A | 11/2009 | |
| WO | 2010134824 | A1 | 11/2010 | |
| WO | 2011079868 | A1 | 7/2011 | |

OTHER PUBLICATIONS

Office Action for related European Patent Application No. 18186183. 2-1007, dated Jan. 3, 2019, 9 pages.

Enriquez Jr. et al., "On Software-based Remote Vehicle Monitoring for Detection and Mapping of Slippery Road Sections", published in International Journal of Intelligent Transportation Systems Research, Sep. 2017, vol. 15, Issue 3, pp. 141-154.

Banks, "Volvo tests cloud-based communication system to make driving safer", Mar. 24, 2014, retrieved from https://newatlas.com/volvo-cloud-based-road-safety/31329/, pp. 1-11.

Staron et al., "Data veracity in intelligent transportation systems: the slippery road warning scenario", Conference Paper, Jun. 2016, 6 pages.

Sapan, "Detection of Road Conditions", Master's Thesis 2016:NN, Jun. 2016, 104 Pages.

* cited by examiner

METHOD AND APPARATUS FOR DETECTING FALSE POSITIVE SLIPPERY ROAD REPORTS USING MAPPING DATA

BACKGROUND

Modern vehicles are increasingly capable of sensing and reporting various road-related events such as slippery road reports as they travel throughout a road network. Typically, slippery road reports are based on sensors indicating loss of adhesion between a vehicle and the road surface. However, using loss of adhesion as a proxy for slippery road conditions can lead to potential false positive reports of slippery roads because loss of adhesion can result from factors other than the slipperiness of the roadway. Accordingly, service providers face significant technical challenges to differentiating between true and false slippery road reports, particularly when receiving reports from thousands or millions of vehicles in real-time.

SOME EXAMPLE EMBODIMENTS

Therefore, there is need for an approach to filtering false positive slippery reports using mapping data.

According to one embodiment, a computer-implemented method comprises receiving a slippery road report from a vehicle. The slippery road report, for instance, indicates that a slippery road event is detected at a location based on sensor information collected by the vehicle. The method also comprises map matching the location of the slippery road report to the mapping data to evaluate a proximity of the location to at least one geographic feature that is designated as an area where driver behavior is expected to be at least one cause of the slippery road event. The method further comprises classifying the slippery road report as a slippery road false positive report based on the evaluation.

According to another embodiment, an apparatus comprises at least one processor, and at least one memory including computer program code for one or more programs, the at least one memory and the computer program code configured to, with the at least one processor, to cause, at least in part, the apparatus to receive a slippery road report from a vehicle. The slippery road report, for instance, indicates that a slippery road event is detected at a location based on sensor information collected by the vehicle. The apparatus is also caused to map match the location of the slippery road report to the mapping data to evaluate a proximity of the location to at least one geographic feature that is designated as an area where driver behavior is expected to be at least one cause of the slippery road event. The apparatus is further caused to classify the slippery road report as a slippery road false positive report based on the evaluation.

According to another embodiment, a computer-readable storage medium carrying one or more sequences of one or more instructions which, when executed by one or more processors, cause, at least in part, an apparatus to receive a slippery road report from a vehicle. The slippery road report, for instance, indicates that a slippery road event is detected at a location based on sensor information collected by the vehicle. The apparatus is also caused to map match the location of the slippery road report to the mapping data to evaluate a proximity of the location to at least one geographic feature that is designated as an area where driver behavior is expected to be at least one cause of the slippery road event. The apparatus is further caused to classify the slippery road report as a slippery road false positive report based on the evaluation.

According to another embodiment, an apparatus comprises means for receiving a slippery road report from a vehicle. The slippery road report, for instance, indicates that a slippery road event is detected at a location based on sensor information collected by the vehicle. The apparatus also comprises means for map matching the location of the slippery road report to the mapping data to evaluate a proximity of the location to at least one geographic feature that is designated as an area where driver behavior is expected to be at least one cause of the slippery road event. The apparatus further comprises means for classifying the slippery road report as a slippery road false positive report based on the evaluation.

According to another embodiment, a computer-implemented method comprises processing historical driver behavior data to identify at least one geographic feature represented in the mapping data that is associated with an area where driver behavior is expected to be at least one cause of a slippery road event. The method also comprises receiving a slippery road report from a vehicle indicating that the slippery road event is detected at a location based on sensor information collected by the vehicle. The method further comprises map matching the location of the slippery road report to the mapping data to evaluate a proximity of the location to the at least one geographic. The method further comprises classifying the slippery road report as the slippery road false positive report based on the evaluation.

According to another embodiment, an apparatus comprises at least one processor, and at least one memory including computer program code for one or more programs, the at least one memory and the computer program code configured to, with the at least one processor, to cause, at least in part, the apparatus to process historical driver behavior data to identify at least one geographic feature represented in the mapping data that is associated with an area where driver behavior is expected to be at least one cause of a slippery road event. The apparatus is also caused to receive a slippery road report from a vehicle indicating that the slippery road event is detected at a location based on sensor information collected by the vehicle. The apparatus is further caused to map match the location of the slippery road report to the mapping data to evaluate a proximity of the location to the at least one geographic. The apparatus is further caused to classify the slippery road report as the slippery road false positive report based on the evaluation.

According to another embodiment, a computer-readable storage medium carrying one or more sequences of one or more instructions which, when executed by one or more processors, cause, at least in part, an apparatus to process historical driver behavior data to identify at least one geographic feature represented in the mapping data that is associated with an area where driver behavior is expected to be at least one cause of a slippery road event. The apparatus is also caused to receive a slippery road report from a vehicle indicating that the slippery road event is detected at a location based on sensor information collected by the vehicle. The apparatus is further caused to map match the location of the slippery road report to the mapping data to evaluate a proximity of the location to the at least one geographic. The apparatus is further caused to classify the slippery road report as the slippery road false positive report based on the evaluation.

According to another embodiment, an apparatus comprises means for processing historical driver behavior data to identify at least one geographic feature represented in the mapping data that is associated with an area where driver behavior is expected to be at least one cause of a slippery road event. The apparatus also comprises means for receiving a slippery road report from a vehicle indicating that the slippery road event is detected at a location based on sensor information collected by the vehicle. The apparatus further comprises means for map matching the location of the slippery road report to the mapping data to evaluate a proximity of the location to the at least one geographic. The apparatus further comprises means for classifying the slippery road report as the slippery road false positive report based on the evaluation.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for detecting false positive slippery road reports using mapping data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
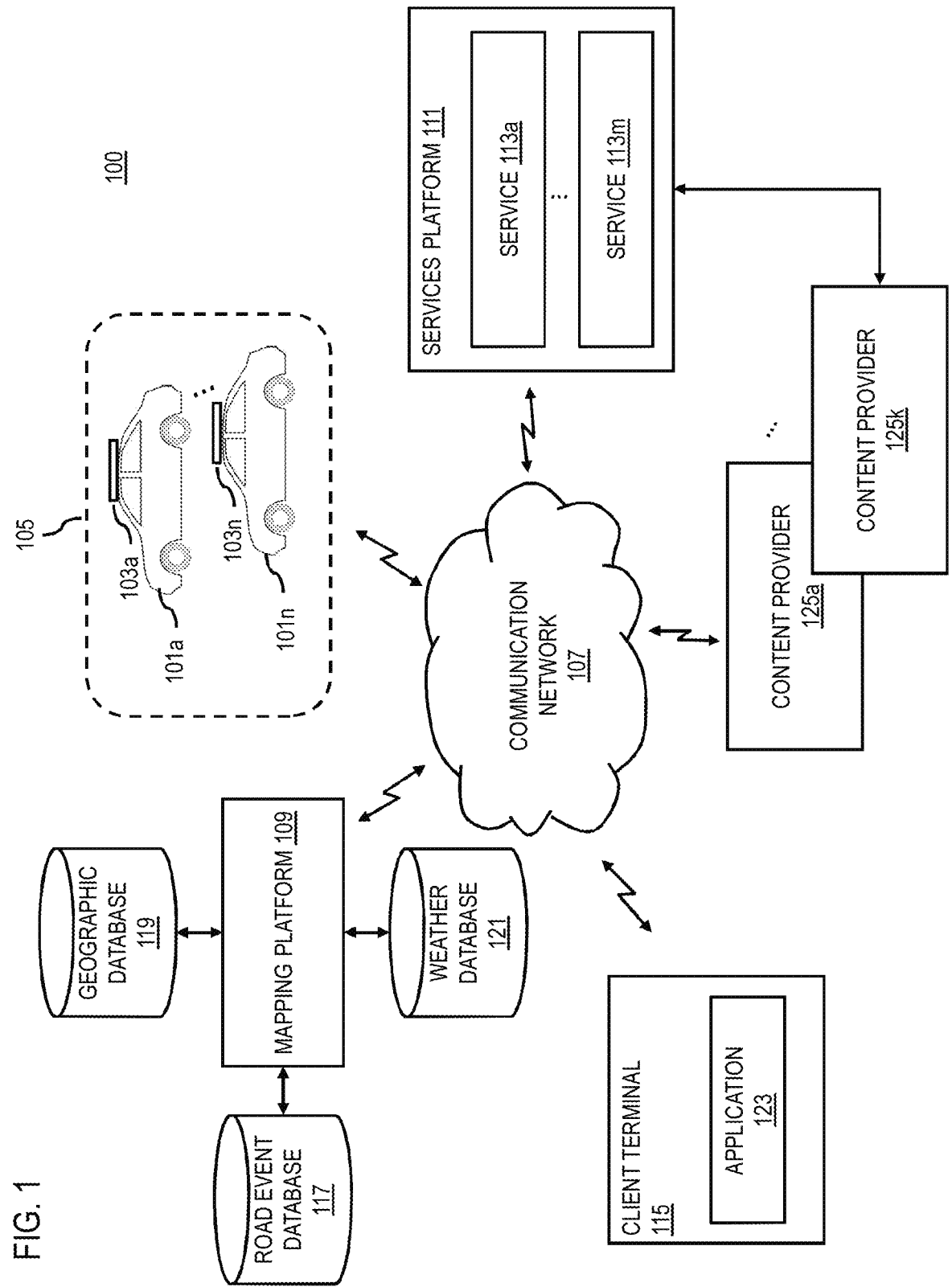
FIG. 1 is a diagram of a system capable of classifying false positive slippery road reports using mapping data, according to one embodiment.

FIG. 1 is a diagram of a system capable of classifying false positive slippery road reports using mapping data, according to one embodiment. Service providers and vehicle manufacturers are increasingly developing compelling navigation and other location-based services that improve the overall driving experience for end users by leveraging the sensor data collected by connected vehicles as they travel. For example, the vehicles can use their respective sensors to detect slippery road conditions (e.g., loss of adhesion between the vehicle and the road on which it is traveling), which in turn can be used for issuing local hazard warning, updating real-time mapping data, as inputs in to a mapping data pipeline process, and/or any other purpose.

As shown FIG. 1, the system 100 comprises one or more vehicles 101a-101n (also collectively referred to as vehicles 101) respectively equipped with sensors 103a-103n (also collectively referred to as sensors 103) for sensing vehicle telemetry data (e.g., speed, heading, acceleration, lateral acceleration, braking force, wheel speed, etc.), road conditions, environmental conditions (e.g., weather, lighting, etc.), and/or other characteristics (e.g., slippery road conditions) of an area of interest 105 of a transportation network (e.g., a road network) in which the vehicles 101 are traveling. The vehicles 101 (e.g., "connected vehicles") are also equipped with communications capability (e.g., a wireless communications device configured to transmit road reports (e.g., slippery road reports) and/or associated sensor data for detecting a slippery road event over a communication network 107 to a mapping platform 109 and/or the services platform 111 (and/or any of the services 113a-113m of the services platform 111, also collectively referred to as services 113). In one embodiment, the vehicles included embedded communications capabilities or be associated or configured with a communications device such as a client terminal 115 or other equivalent system to report detected slippery road events.

In one embodiment, slippery road reports and/or reports of other road incidents provided by the vehicles 101 are collected, processed, and stored by the mapping platform 109 as map data in the road event database 117 and/or geographic database 119. Accordingly, in one embodiment, the map data provided to other vehicles 101 traveling the road network include incident reports (e.g., slippery road reports) indicating road events related to the road segment being travelled. For example, a slippery road report may indicate that the particular road segment is slippery and therefore dangerous to drive. The slippery conditions of a road are typically due to low friction of the road surface. These low friction road conditions, for instance, may depend on many factors such as weather, temperature, humidity, road surface type, road surface quality, etc. Generally, the level of adhesion between the road surface and the vehicle 101 (e.g., tires of the vehicle 101) is used estimate or detect these low friction conditions.

These adhesion event reports (e.g., slippery road reports) are typically generated based on information provided by multiple vehicles under different driving conditions (e.g., different driving behaviors, speeds, etc.) and different environmental conditions (e.g., weather conditions). However, because these adhesion events include factors related to driving behavior, there can be the potential to generate false positive slippery road reports when driving behavior is the dominant factor in detecting a loss of adhesion between the vehicle 101 and the road way. In other words, in a false positive slippery road event, the detected loss of adhesion (e.g., sensed wheel spin, sensed acceleration or deceleration behind a threshold value, etc.) is attributable to the way a driver is operating the vehicle 101 as opposed to an actual low friction condition of the roadway. Therefore, service providers face significant technical challenges to automatically differentiating the contribution of driving behavior from low friction road conditions to detect false positive slippery road events, particularly the number of reports increase with the increasing prevalence of vehicles 101 capable of sensing and transmitting slippery road reports.

Historically, service providers (e.g., via the mapping platform 109, the services platform 111, and/or services 113) have aggregated slippery road event reports (e.g., each report comprising sensor data in addition to a location and time the data was sensed by the vehicle 101) for further processing and action. For example, the service providers can aggregate the reports to generate and transmit road event messages to alert end users of any detected road event (e.g., a slippery road event) as a local hazard warning. This aggregation and processing generally occurs in near real-time in predetermined time epochs (e.g., 15-30 minute time epochs). In other words, the vehicle sensor data reports are aggregated into bins according to a distance threshold and a time window (e.g., the time epoch). For example, if reports indicating a road event are received within the current time epoch under evaluation, then the service provider can transmit a message indicating the road event (e.g., over a Radio Data System-Traffic Message Channel (RDS-TMC) or equivalent system).

In many cases, a high number of false positive slippery road reports can lead to reduced map data reliability and potentially wasted resources. Examples of wasted resources include, but are not limited to, computational resources of the mapping platform 109 to process the false positive reports; and/or resources of the vehicles 101 used to respond to false positive reports such as by unnecessarily recalculating navigation routes, initiating alternative autonomous operations (e.g., when the vehicle 101 is an autonomous vehicle). In other words, the quality of the map data including the slippery road reports relied upon by location-based and/or navigation services directly impacts the ability of the vehicles 101 (particularly an autonomous vehicle) to operate effectively. For example, the vehicles 101 typically employ onboard navigations systems for interacting with a global positioning service, mapping service or the like to receive relevant location information, slippery road reports, reports of other road events (e.g., precipitation, visibility, speed, etc.), driving instructions, traffic information and other data for supporting independent navigation of the vehicle. Based on this data, the vehicle may execute various actions (e.g., change operation mode from autonomous to manual or vice versa, initiate a turn, accelerate, brake) relative to the travel path upon which it is navigating. If the received reports are false positives (e.g., a false positive slippery road event), these actions may be taken unnecessarily thereby unnecessarily expending vehicle resources.

To address this problem, the system 100 of FIG. 1 introduces a capability to detect and/or suppress false positive slippery road reports using mapping data (e.g., mapping data stored in the geographic database 119). By way of example, "suppress" refers, for instance, to flagging or otherwise indicating in the system 100 that the slippery road reports detected as false positive are not to be further processed or acted on by the system 100, thereby advantageously conserving computing resources of the system 100 In one embodiment, the system 100 uses the mapping data to determine geographical features that are associated with areas where driver behavior is likely to contribute to generating a false positive slippery road report. These geographical features can be, for instance, geographic features or areas where a vehicle 101 is likely to brake or accelerate. This is because excessive acceleration or deceleration at the locations of these features can potentially produce false positive slippery road reports. In other words, acceleration or deceleration of the vehicle 101 can lead to loss of adhesion between the vehicle 101 and the road surface even under normal road conditions (e.g., non-slippery or dry conditions). Accordingly, slippery road reports generated near these features are more likely to lead to false positive slippery road reports, and can be classified or detected as such by the system 100.

In yet another embodiment, the system 100 can also use weather data alone or in combination with the mapping data to classify a potential false positive slippery report. For example, when weather data is used alone, if the weather data indicates that a road surface is dry (e.g., because there has been no precipitation at the location of the slippery road event) then it is more likely that this slippery road event is false. Therefore, in one embodiment, the detection of a dry road from weather data can be sufficient to classify a slippery road report from the that same road as a false positive. In other embodiments, weather data can be used in combination with mapping data so that slippery road reports from locations associated with geographic features (e.g., intersections) where the vehicle 101 is likely to brake or accelerate can be classified as false positives when the road conditions are dry according to the weather data.

In one embodiment, the system 100 can use a variety of mapping data related processes to detect or classify false positive slippery road reports. For example, the system 100 can use the mapping data to determine whether the location of a slippery road report is map matched to within a distance threshold to a geographic feature (e.g., a road link). If the slippery road event is not close to a feature or road link, the system 100 can classify or otherwise detect that the corresponding slippery road report is false positive slippery road report. Slippery road reports that are not close to a road link are likely to be from non-road areas (e.g., parking lots, rural roads, etc.) where false positive road events may be more likely. Accordingly, the system 100 can classify or suppress such slippery road reports as false positives.

Figure 2:
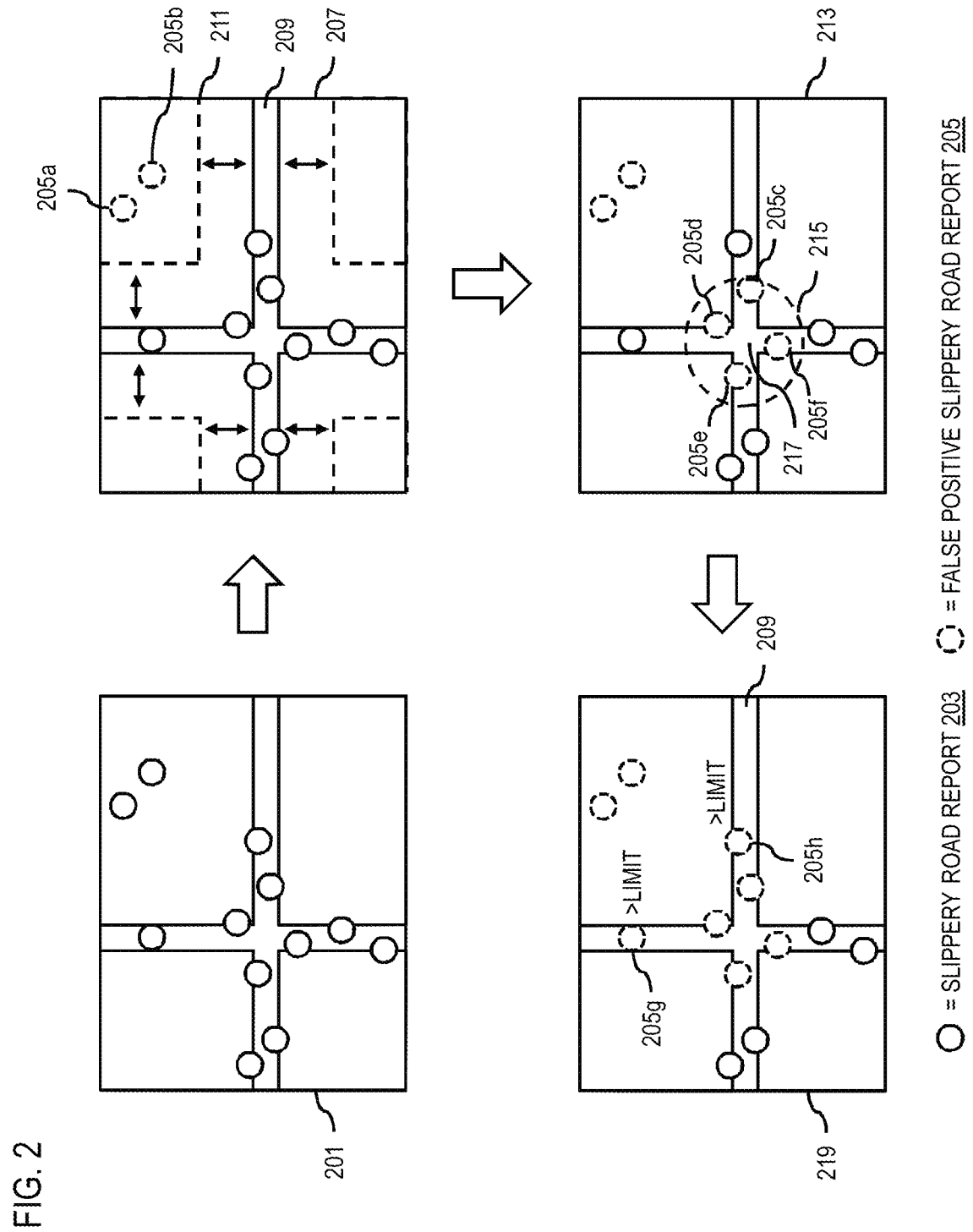
FIG. 2 is a diagram illustrating an example of using the system of FIG. 1 to filter false positive slippery road reports, according to one embodiment.

An example of this embodiment is illustrated in FIG. 2. As shown, a map 201 depicts slippery road reports 203 at their corresponding locations on a map. The map 201 represents an initial set of slippery road reports 203 on which no false positive detection or classification has been performed. A slippery road report 203 is illustrated as a solid circle, and a false positive slippery report 205 is illustrated as a dotted circle. The map 207 illustrates an example of map matching the slippery road reports 203 to the closest road link 209 or equivalent feature. The system 100 then applies a distance threshold 211 around the road link 209 to classify or detect false positives. Slippery road events 203 that are greater than the distance threshold 211 away from the closest road link 209 are classified as false positive slippery road reports 205. In this example, two slippery road events 203 are beyond the distance threshold 211, and therefore are classified as false positive slippery road reports 205a and 205b.

In another embodiment, the system 100 identifies other map features that are also indicative of false positive slippery road reports. For example, these features include intersections, ramps, junctions, and/or other features or location of a road network where vehicles tend to brake or to accelerate from when approaching or leaving. As noted above, these areas can include, but are not limited to, intersections, curves, ramps, junctions, and/or the like. Accordingly, in one embodiment, the system 100 can classify or otherwise detect a slippery road report as a false positive slippery road report when the location of the slippery road report is with a threshold distance of such a feature (e.g., an intersection).

An example of this classification process is illustrated in map 213 of FIG. 2. As shown, a threshold distance 215 is designated around an intersection feature 217 (e.g., a road intersection where two roadways cross, or a node of the geographic database 119 from which at least three links originate). The slippery road events 203 that fall within the threshold distance can then be classified as false positive slippery road reports (e.g., false positive slippery road reports 205c-205f).

In one embodiment, the system 100 can use weather data for the locations of the slippery road events in combination with determining whether the slippery road events are located with the threshold distance of a feature of interest (e.g., the intersection 217). For example, if the weather data indicate that the road conditions should be dry, the slippery road events falling within the threshold distance of the intersection can be classified as false positives. However, if weather data indicate that the road conditions should be wet, icy, snowy, and/or the like, then the slippery road report will not be classified as a false positive even if the report falls within the threshold distance of the intersection or other similar feature where the vehicle is expected to brake or accelerate.

In yet another embodiment, the system 100 can further detect or classify false positive slippery road reports based on other metadata stored in the mapping data. One example, metadata may include, but is not limited, to a posted speed limit for a road segment or link to which the slippery road report is map matched (e.g., speed limit data can be stored and retrieved from the geographic database 119). In one embodiment, the system 100 can determine a travel speed of a vehicle 101 that transmitted the slippery road report at a time when the report was created. For example, the speed data may be included in the slippery road report or in sensor data associated with the slippery road report. The system 100 then compares the vehicle speed to corresponding speed limit (or a factor of the speed limit). If the vehicle speed is above the limit or factor of the limit, then the corresponding slippery road report can be classified as a false positive slippery road report. This is because vehicles 101 traveling at a high speed are indicative a driver behavior that can result in loss of adhesion instead that can be mistakenly reported as a slippery road event due to loss of adhesion.

An example of the speed evaluation process is illustrated in map 219 of FIG. 2. In this example, the respective speeds of the reporting vehicles are determined for each slippery road report 203 and compared against the speed limit determined for the corresponding segment of the road link 209. As shown, two slippery road events are determined to have speeds above the speed limits of the respective road link 209, and have been classified as false positive slippery road reports 205g and 205h.

In one embodiment, the various embodiments of processes for classifying false positive slippery road events described above can be performed alone or in any combination.

Figure 3:
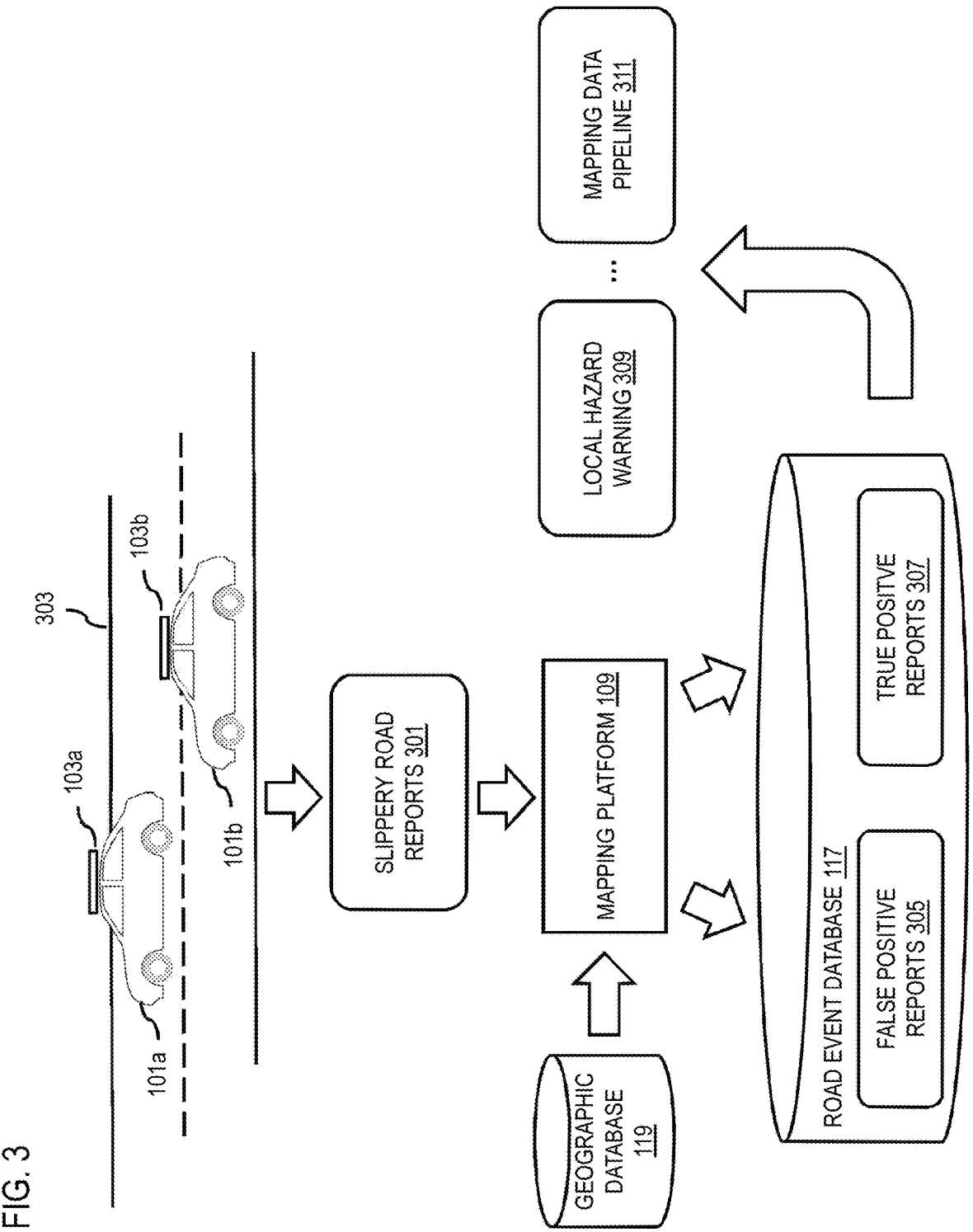
FIG. 3 is a diagram illustrating processes occurring between components of the system FIG. 1 used to classify false positive slippery road events, according to one embodiment.

FIG. 3 is a diagram illustrating processes occurring between components of the system FIG. 1 used to classify false positive slippery road events, according to one embodiment. As shown in FIG. 3, the mapping platform 109 receives slippery road reports 301 from vehicles 101 (such as the vehicle 101a equipped with sensors 103a and the vehicle 101b equipped with sensors 103b) as the vehicles 101 travel on a road network. The slippery road reports 301 are tagged with locations where the respective slippery road conditions were sensed (e.g., locations along the road segment 303). The mapping platform 109 map matches the slippery road reports 301 against various geographic features of the geographic database 119 that are indicative of a driver behavior cause of the reported slippery road event. The mapping platform 109 can then classify each of the slippery road reports 301 as a false positive report 305 or a true positive report 307 for storage in the road event database 117 according to various embodiments described herein. In one embodiment, the true positive reports 307 or the slippery road reports 301 not classified as false positives are forwarded for use by other components of the system 100 (e.g., for local hazard warning processes 309 and/or other functions of a mapping data pipeline 311 such as a pipeline for real-time map updates and/or related services).

Figure 4:
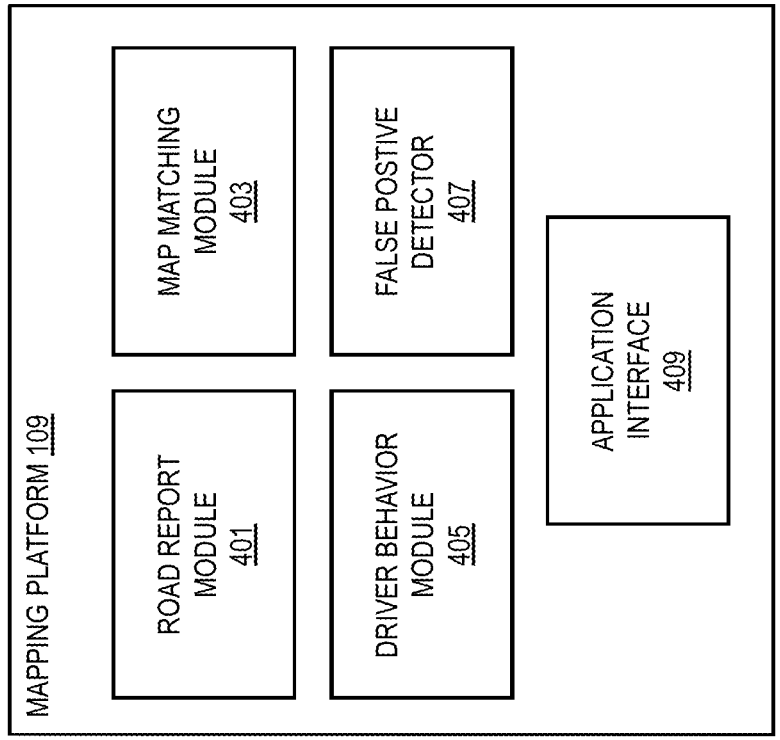
FIG. 4 is a diagram of the components of a mapping platform capable of classifying false positive slippery road reports, according to one embodiment.

FIG. 4 is a diagram of the components of a mapping platform capable of classifying false positive slippery road reports, according to one embodiment. By way of example, the mapping platform 109 includes one or more components for providing a confidence-based road event message according to the various embodiments described herein. It is contemplated that the functions of these components may be combined or performed by other components of equivalent functionality. In this embodiment, the mapping platform 109 includes road report module 401, map matching module 403, driver behavior module 405, false positive detector 407, and an application interface 409. The above presented modules and components of the mapping platform 109 can be implemented in hardware, firmware, software, or a combination thereof. Though depicted as a separate entity in FIG. 1, it is contemplated that the mapping platform 109 may be implemented as a module of any of the components of the system 100 (e.g., a component of the vehicle 101, services platform 111, services 113, client terminal 115, etc.). In another embodiment, one or more of the modules 401-409 may be implemented as a cloud based service, local service, native application, or combination thereof. The functions of the mapping platform 109 and the modules 401-409 are discussed with respect to FIGS. 4-8 below.

Figure 5:
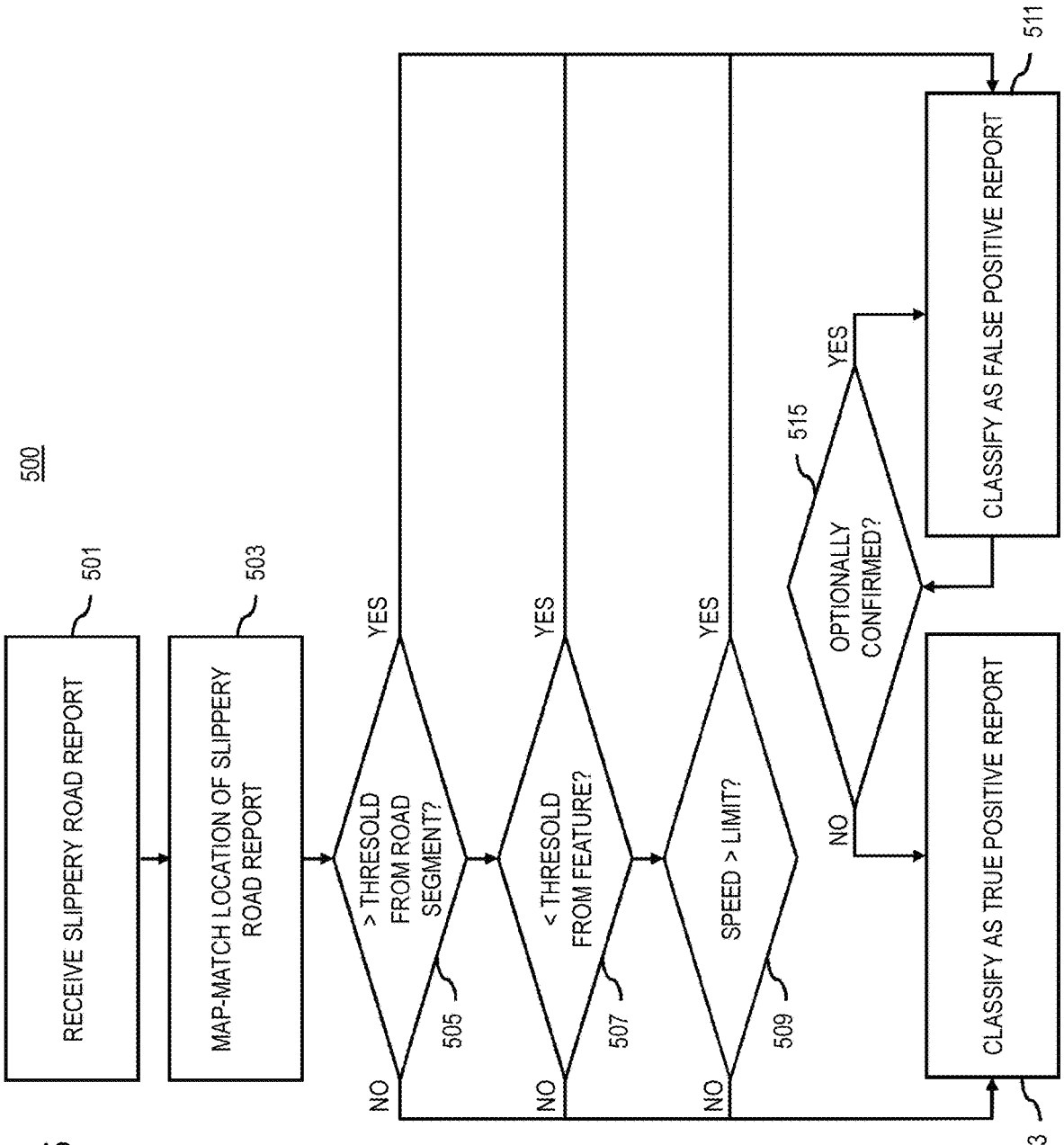
FIG. 5 is a flowchart of a process for classifying false positive slippery road reports, according to one embodiment.
Figure 11:
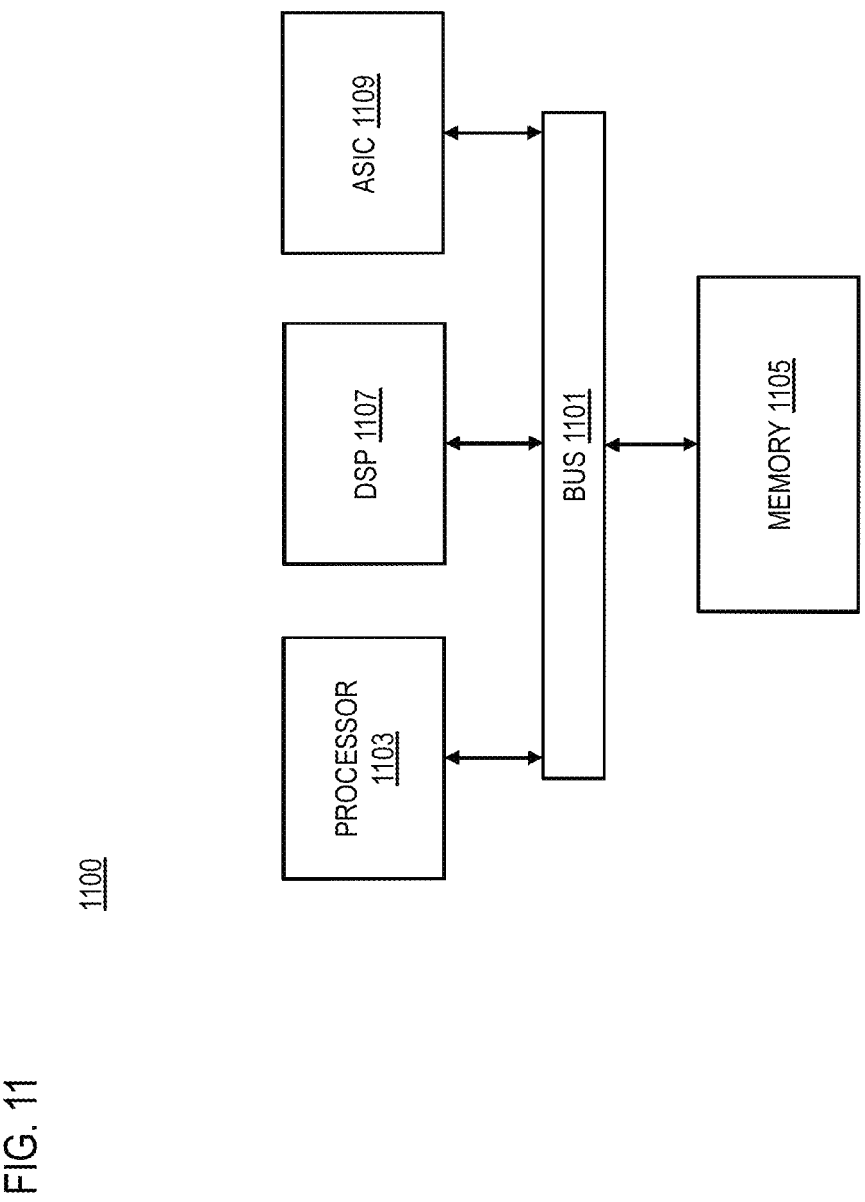
FIG. 11 is a diagram of a chip set that can be used to implement an embodiment of the invention, according to one embodiment.

FIG. 5 is a flowchart of a process for classifying false positive slippery road reports, according to one embodiment. In various embodiments, the mapping platform 109 and/or any of the modules 401-409 of the mapping platform 109 as shown in FIG. 4 may perform one or more portions of the process 500 and may be implemented in, for instance, a chip set including a processor and a memory as shown in FIG. 11. As such, the mapping platform 109 and/or the modules 401-409 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all of the illustrated steps.

In step 501, the road report module 401 receives a slippery road report from a vehicle. The slippery road report, for instance, indicates that a slippery road event is detected at a location based on sensor information collected by the vehicle. In one embodiment, the vehicles 101 generate and report slippery road reports as they travel in a road network. To support real-time or near real-time monitoring of slippery road events, the slippery road reports are generated and transmitted to the road report module 401 within a short period of time after the data is collected (e.g., often within minutes or within a currently defined time epoch). By way of example, the slippery road reports are based on sensor data collected from one or more sensors 103 of the one or more vehicles 101. In one embodiment, the vehicles 101 can use any combination of its onboard sensors 103 to detect a slippery road event (e.g., an event in which friction or adhesion between the road surface and the vehicle 101's tires are reduced). The vehicle 101 can use, for instance, a combination of wheel speed sensors, accelerometers, steering wheel angle sensor, body roll sensors, and/or the like to sense conditions associated with a slippery road event. It is contemplated that any combination of sensors 103 and related algorithm for detecting the slippery road event or any other road event can be used with the embodiments described herein. Other road events (e.g., precipitation events, visibility events, vehicle speed/heading data, etc.) may be detected and included in the slippery road reports based on different combinations of sensors 103 and detection algorithms. For example, a precipitation event can be detected based on windshield wiper activation sensors. Similarly, a visibility event (e.g., an event indicating reduced visibility from the vehicle 101) can be detected based on a camera or light sensors.

In many cases, because of the variety of available sensors 103 and vehicles 101, different vehicle types and/or manufacturers can use different combinations of sensors 103 and/or algorithms for detecting and reporting a slippery road event to the mapping platform 109. For example, accelerometers can be used to sense the acceleration or deceleration rates of a vehicle 101 from a first manufacturer. Then if the sensed rates are outside a specific threshold window, a slippery road event or other similar road event can be inferred. In contrast, another vehicle manufacturer may use wheel speed or rotation sensors to detect the same slippery road event.

In one embodiment, the slippery road report from the vehicles 101 can include at least: (1) an indication of the detection of the slippery road event; (2) a location of the detected road event (e.g., in coordinates such as latitude, longitude, and altitude if available); and (3) a time of the detected road event (e.g., in Coordinated Universal Time (UTC) or equivalent). In one embodiment, the slippery road report can include the underlying raw sensor data used to detected the slippery road event. In this way, the road report module 401 can process the sensor data in the report to independently determine the slippery detected road event.

In one embodiment, the road report module 401 can receive slippery road reports individually or in batches. When operating in batch mode, the reports of the slippery road event are aggregated from an area of interest based on a predetermined time epoch. In other words, the road report module 401 aggregates slippery road reports according to both area and time. For example, the road report module 401 can segment a road into 50-meter segments (or other distance/area threshold) and then aggregate slippery road reports from each segment or area of interest according to time epochs (e.g., 15-30 min) epochs. In one embodiment, for real-time or near real-time reporting, a specified number of the most current time epochs can be evaluated to detect false positive slippery road reports according to the various embodiments described herein.

In step 503, the map matching module 403 map matches the location of the slippery road report to the mapping data to evaluate a proximity of the location to at least one geographic feature that is designated as an area where driver behavior is expected to be at least one cause of the slippery road event. In one embodiment, map matching refers to converting the geographic coordinates indicating a location of a slippery road event to a corresponding location of a digital map representation of, for instance, the geographic database 119. It is contemplated that any map matching process known in the art may be used to translate the location of a slippery road event to the digital mapping data of the geographic database 119. In one embodiment, the map matching process can project the location or coordinates of the slippery road event onto a road segment, link, node, and/or other feature represented in the mapping data of the geographic database 119. Map matching of the location of the slippery road event enables the false positive detector 407 to directly compare the spatial relationship of the slippery road event to map features that where driver behavior is likely to cause a slippery road event to be detected.

In one embodiment, the evaluation of the proximity or spatial relationship between the slippery road report and the map feature of interest includes scenarios determining when the slippery road report far from a map feature of interest as well as when the slippery road report is near the feature of interest. For example, in the far scenario, the geographic feature can a road segment or road link represented in the mapping data. During the map matching process, the location of the slippery road event is map matched to closest feature such as a road segment or road link. However, in step 505, if the distance between the reported location of the slippery road event and the road segment or link to which the location is map matched is greater than a distance threshold, there is a possibility that the slippery road location may in fact be located on some feature that is not represented in the mapping data (e.g., the geographic database 119). For example, the map matched road segment or link can be closest navigable road segment. Therefore, by being more than a threshold distance away from this navigable road segment, the slippery road event may have occurred in some adjacent area of the matched road link that does not support normal driving such as a parking lot or other off-road feature (e.g., non-navigable).

In one embodiment, navigable road segment refers a road segment that is a traditional road supporting normal traffic flows, while non-navigable road segments or areas refer to places on the map where normal traffic is not expected to flow (e.g., parking areas where cars are expected to stop, vehicle test facilities where vehicles are operated to test performance, airports, unpaved roads, restaurant drive-through lanes, etc.). In many cases, these non-navigable or unrepresented off-link or off-road locations are associated with locations where vehicles 101 are more likely to start and stop frequently where user behavior is more likely to result in adhesions events (e.g., detected loss of adhesion between road and vehicle). As a result, matching them to the closest link can result in false positive slippery road reports for matched road link or segment. Accordingly, the false positive detector can classify slippery road reports whose reported locations are greater than a distance threshold to the feature (e.g., road link or segment) to which the location is map matched as a false positive slippery road report (step 511). Otherwise, slippery road report is classified as not a false positive (step 513).

Step 507 is an example of a near scenario where the false positive detector 407 can classify a false positive slippery road report based on its closeness to map features that are associated areas where driver behavior is likely to cause slippery road events as opposed to low friction of a road surface. As previously discussed, these features are areas where a vehicle 101 is likely to brake or accelerate such as, but not limited to, intersections, curves, ramps, junctions, etc. represented in the geographic database 119. In one embodiment, if the map matching of step 503 indicates the that a slippery road report is located within a threshold distance or proximity of one of these map features (e.g., an intersection), the false positive detector 407 can classify the slippery road report as a false positive slippery road report (step 511). Otherwise, the slippery road report is classified as not a false positive (step 513).

In one embodiment, the false positive detector 407 can correlate the proximity of the slippery road report to these map features with weather data to further refine the determination of whether the slippery road report is a false positive. For example, weather that makes a road wet, icy, snowy, and/or the like are often correlated with slippery road conditions. Accordingly, as noted above, the false positive detector 407 can classify a slippery road report as not a false positive (or a true positive) even if the slippery road report is within the distance threshold of a map feature of interest (e.g., an intersection) when weather data indicates the road surface is likely to have been slippery (or not dry) at the time the slippery road report was generated. As previously noted, in one embodiment, the false positive detector 407 can use weather data as an independent or sole factor in classifying a slippery road report as a false report. For example, the false positive detector 407 can classify slippery road reports as false positive based solely on whether the road or location of the slippery road report was dry at the time of the report. In other words, slippery road reports originating from dry roads as determined from weather data would can be classified as false positives without considering the underlying mapping data in some embodiments.

In one embodiment, to further base the detection of false positive slippery road reports on weather data, the false positive detector 407 retrieves weather data records for the location and time of the corresponding slippery road report. For example, the location and time of the slippery road report is used to query the weather database 121 or other third-party/external weather service providers for the corresponding weather data. In scenarios where no weather station data is available for a requested location, weather data can be interpolated from nearby weather stations. In one embodiment, the false positive detector 407 uses weather data as a proxy for assessing the conditions of a corresponding roadway. This proxy is used for evaluating potential false positive slippery road reports because the weather data is derived from a data source (e.g., third-party weather service providers) separate from the vehicles 101 themselves.

In one embodiment, the false positive detector 407 transforms the weather data into an indication of the slippery level of a roadway associated with the slippery road report. For example, to determine the slippery level of a road, the false positive detector 407 determines an air temperature parameter, a precipitation intensity parameter, a visibility parameter, or a combination thereof from the weather data records. The slippery level or pavement conditions (e.g., dry, damp, wet, snow, frost, ice, etc.) are then estimated from the weather parameters of the weather data records (e.g., pavement temperature and estimated water film depth). It is contemplated that short term, third party weather conditions from any weather service provider (e.g., the services platform 111 and/or services 113 that maintain the weather database 117) may be used. The weather services can provide an application programming interface (API) to the false positive detector 407 or any other module of the mapping platform 109 to retrieve the weather data records for the locations and times corresponding to the slippery road report of interest.

Table 1 below illustrates example weather parameters for estimating the slippery level of a road according to various embodiments described herein. As shown in Table 1, the false positive detector 407 uses air temperature and precipitation intensity in the last X hours to determine the proxy to the pavement conditions (e.g., the slippery level of the road segment).

TABLE 1

| Air Temperature (C.) | Precipitation Intensity in Last X Hours | Slippery Severity Level |
|---|---|---|
| >0 | =0 | Slippery Level 0 [Dry] |
| <2 | =0 (but visibility <9 miles) | Slippery Level 1 [Frost] |
| >0 | >0 and <T1 | Slippery Level 2 [Damp] |
| >0 | >=T1 | Slippery Level 3 [Wet] |
| <=0 | >0 | Slippery Level 4 [Icy] |

In one embodiment, T1 as listed in Table 1 is a configurable threshold on precipitation intensity that distinguishes between light and heavy rain which contribute to damp or wet pavement. This value can be set so that the predicted slippery level matches observed ground truth data. In addition or alternatively (e.g., when ground truth data is not available), the false positive detector 407 can specify a default value for T1 such as 0.3 inches (0.76 cm) per hour.

In the example of Table 1, the false positive detector 407 provides for criteria for classifying a road segment into any of five road condition levels (e.g., dry, frost, damp, wet, and icy). For example, if weather data retrieved for a road segment or area of interest corresponding to a detected slippery road event indicates that precipitation intensity >=T1 and air temperature >0, then the road segment or area of interest can be assigned a slippery level=2.

In one embodiment, the false positive detector 407 uses the weather data (e.g., determined slippery level) for a location and time of the slippery as an additional factor for classifying a slippery road report. For example, after determining that a slippery road report corresponds to a location within a threshold distance of a map feature of interest (e.g., an intersection), the false positive detector 407 will classify the slippery road report as a false positive if the corresponding weather data indicates that the road was at or below a targeted slippery level. For example, the report can be classified as a false positive if the slippery level indicates that the road is dry (e.g., slippery level=0) (step 511), and not a false positive when the slippery level indicates is not dry (e.g., slippery level >=1) (step 513).

In yet another embodiment, the false positive detector 407 can use additional contextual parameters queried from mapping data of the geographic database 119 to classify false positive slippery road reports (step 509). For example, the false positive detector 407 can use determine the road link or segment to which a slippery road report is map matched. The false positive detector 407 can then query the geographic database for the speed limit associated with the road link to compare against the vehicle speed of the vehicle 101 reporting the slippery road event. By way of example, the false positive detector 407 can process sensor data from the vehicle reporting the slipper road event to determine the vehicle speed, or can extract the speed from the slippery road report if included in the report. In one embodiment, if the vehicle speed is greater than the speed limit of the corresponding road link, the false positive detector classifies the slippery road report as a false positive (step 511). Otherwise, the slippery road report is classified as not a false positive (step 513). In one embodiment, the false positive detector can apply a configurable factor to the speed limit before making the false positive determination. For example, the factor can be used to increase or decrease the retrieve speed limit to fine tune the classification. For example, the factor can be adjusted to correlate with ground truth data reflecting a correlation between speed and false positive results.

In one embodiment, the false positive detector 407 can optionally interact with the application interface 409 to confirm a slippery road report that has been detected as being a false positive (step 515). For example, the application interface 409 can initiate a presentation a user interface to a user of the vehicle reporting the slippery road report to request confirmation of the false positive classification. In one embodiment, the false positive detection and confirmation request can be performed in real-time or near real-time as the vehicle 101 collects sensor data to generate the slippery road reports. In this way, the user or driver of the reporting vehicle 101 can provide near immediate confirmation or rejection of the false positive detection. Based on the confirmation or rejection of the detected false positive, the false positive detector 407 can update a data record of the slippery road report (e.g., in the road event database 117). For example, if confirmed, the data record can remain as indicating that the slippery road report is a false positive (at step 511). If not confirmed, the data record can be updated to indicate that the slippery road report is not a false positive (at step 513).

In one embodiment, the false positive detector 407 can suppress the slippery road reports that marked or confirmed as false positive reports. For example, when a data record of the slippery road report is updated to indicate that the report has been classified as a false positive slippery road report, the system 100 or any of the its components (e.g., the mapping platform 109, the vehicles 103, services platform 111, services 113, etc.) will no longer consider the false positive slippery report for further action. In one embodiment, these further actions may include, but are not limited to, transmission as a local hazard warning, or further processing in a mapping data pipeline (e.g., updating the data of the geographic database 119, the road event database 117, etc.) when reports are classified as false positives. For example, in embodiments where the false positive detection occurs locally at the vehicle 103, suppressing of a false positive report can include the removal of the false positive slippery road report from a transmission queue of road event reports that are to be reported to a vehicle manufacturer cloud service, the mapping platform 103, or other component of the system 100. In a use case where slippery road reports are collected by the mapping platform 109 to create a friction map to indicate areas where slippery road conditions occur routinely, periodically, etc., suppressing of false positives results in removing the false positive slippery road report from a mapping data pipeline used to create or update the friction map and/or any other mapping data records (e.g., records of the geographic database 119).

Figure 6:
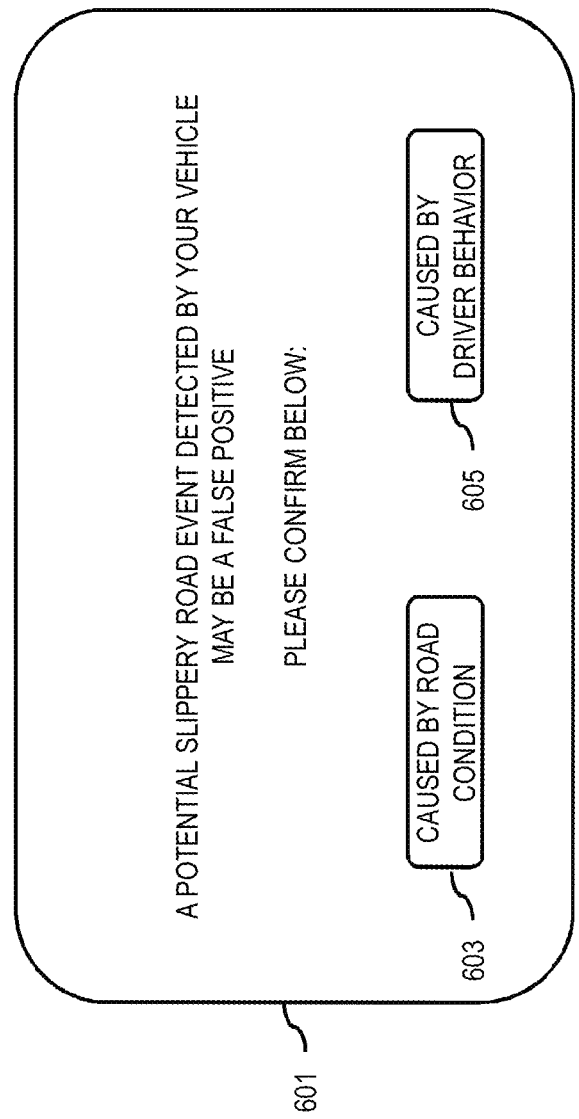
FIG. 6 is a diagram illustrating an example user interface for confirming a false positive slippery report classification, according to one embodiment.

FIG. 6 is a diagram illustrating an example user interface for confirming a false positive slippery report classification, according to one embodiment. As shown, a user interface (UI) 601 is presented, for instance, via an embedded system (e.g., navigation system, vehicle control system, client terminal 115, etc.) of a vehicle 101 when a slippery road report is generated, and the mapping platform 109 detects that the report is a false positive. The UI 601 presents a message indicating that "a potential slippery road event detected by your vehicle may be a false positive" and provides an option 603 to indicate that the slippery road event is caused by actual road conditions (e.g., low road friction) and an option 605 to indicate that the slippery road event is caused by driver behavior (e.g., excessive acceleration or speed).

In the various embodiments described herein, the mapping platform 109 evaluates whether various map features, threshold values (e.g., distance thresholds for being far or close to a map feature of interest, etc.), and/or parameters (e.g., speed limits and related factors). The features, thresholds, parameters, etc. may be configurable to tune to the false positive detection or classification. For example, default or system values can be used for these values throughout the system (e.g., distance threshold for being far form a matched road segment can be >100 m, distance threshold for being near an intersection can be <25 m, etc.). In addition or alternatively, historical driver behavior may be used to configure the system 100 as described below with respect to FIG. 7.

Figure 7:
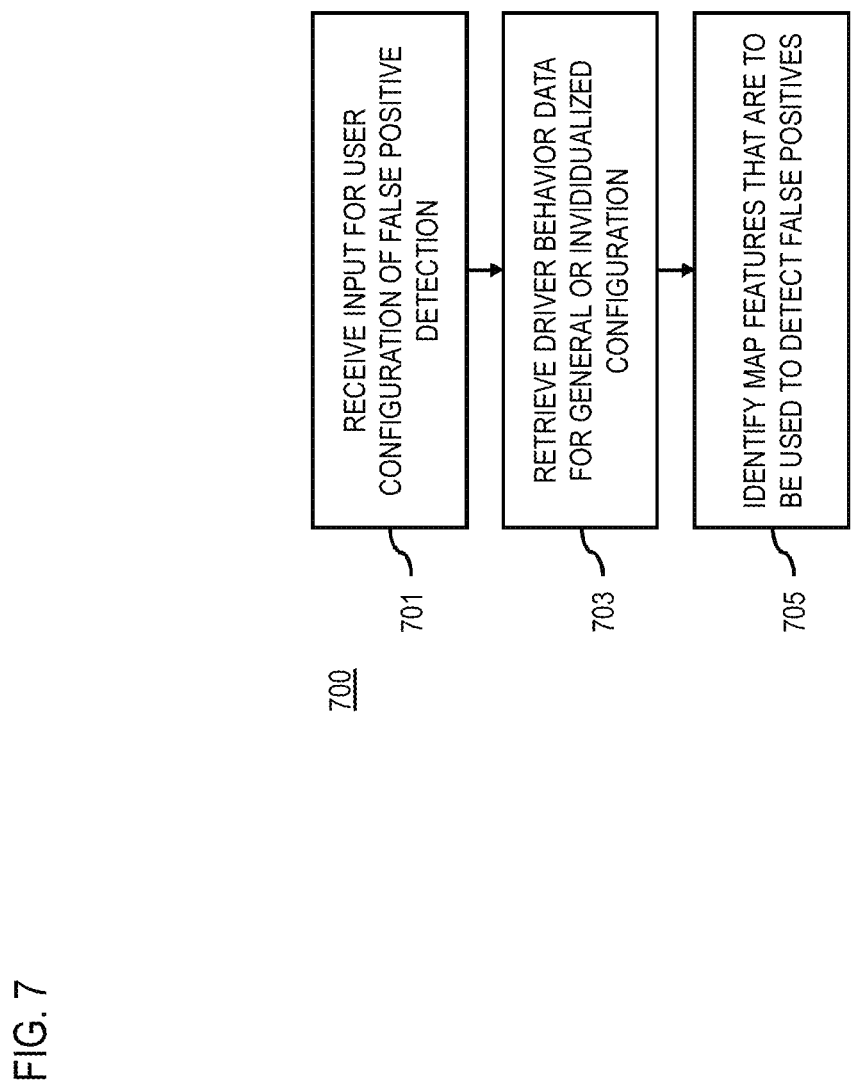
FIG. 7 is a flowchart of a process for using historical driver behavior data to classify false positive slippery road events, according to one embodiment.

FIG. 7 is a flowchart of a process for using historical driver behavior data to classify false positive slippery road events, according to one embodiment. In various embodiments, the mapping platform 109 and/or any of the modules 401-409 of the mapping platform 109 as shown in FIG. 4 may perform one or more portions of the process 700 and may be implemented in, for instance, a chip set including a processor and a memory as shown in FIG. 11. As such, the mapping platform 109 and/or the modules 401-409 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

Figure 8:
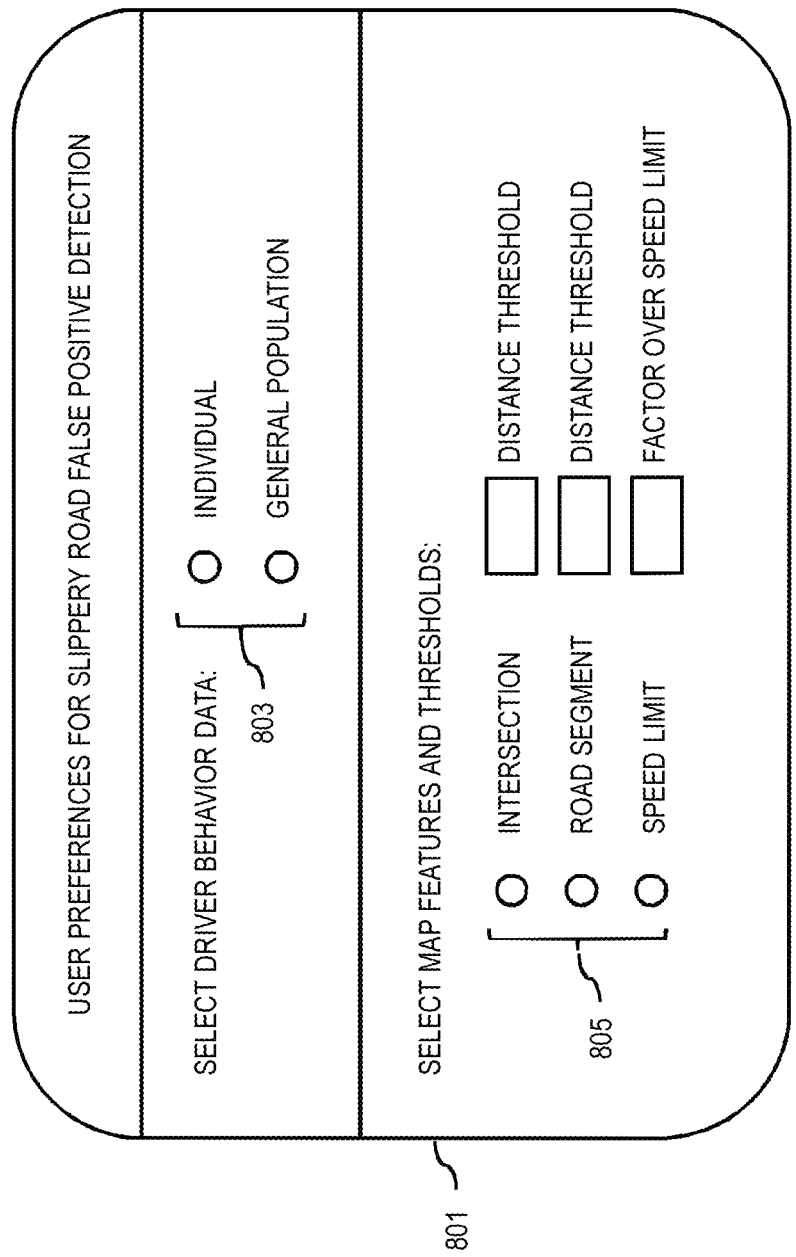
FIG. 8 is a diagram illustrating an example user interface for configuring the use of historical driver behavior data to classify false positive slippery road events, according to one embodiment.

In step 701, the driver behavior module 405 receives an input from the user to configure the false positive detection parameters and/or preferences described in the various embodiments. FIG. 8 illustrates an example of a UI 801 can be used to receive the user input. For example, the UI 801 can provide options 803 for using individualized or general population driver behavior data for configuring the embodiments of false positive detection described herein. In one embodiment, driver behavior data refers to sensor data (e.g., vehicle telemetry data) collected from one or more vehicles 101 as they travel in a road network. This data can include traditional probe data (e.g., heading, speed, location, timestamp, etc.) as well as data from any other sensors of the vehicles (e.g., acceleration, lateral acceleration, body roll, wheel speed, steering wheel angle, throttle position, wiper activation, headlight activation, etc.).

When individualized driver behavior data is selected in the UI 801, the mapping platform 109 uses only the driver behavior collected from one or more vehicles 101 associated only with the user to configure the false positive detection parameters (step 703). When general population driver behavior data is selected, the mapping platform 109 uses driver behavior data for a group of drivers (e.g., all drivers, drivers with similar characteristics, drivers of similar vehicle types, etc.) to configure the false positive detection parameters.

In either case, in one embodiment, the driver behavior module 405 processes the driver behavior data to determine map features (e.g., intersections, curves, ramps, junctions, etc.) or other locations where the vehicle(s) represented in the data accelerate or brake. These determined features or locations can be used as the map features against which false positive detections or classifications are made (step 705). In addition, the driver behavior module 405 can process the driver behavior to estimate applicable thresholds or parameters. For example, the driver behavior data may indicate the braking or acceleration distance as the vehicle(s) approach various map features (e.g., intersections). The distances can then be used as calculate the threshold distances for determining how near the map feature a slippery road report must be located to be classified as a false positive or potential false positive. If speed limits are not available for a given segment or individualized speed limits are desired, the applicable speed limits (e.g., individualized or general) can be similarly calculated, for instance, by calculating travel speeds by the vehicle(s) along the road link or segment of interest.

In yet another embodiment, the map features to use and the corresponding thresholds can be specified by a user or an administrator of the mapping platform 109. For example, the UI 801 includes options 805 for selecting which types of map features to use for false positive detection. Next to each map feature, the UI 801 also presents fields for inputting the corresponding thresholds or criteria (e.g., the speed limit or factor to apply to the speed limit).

Returning to FIG. 1, in one embodiment, the vehicles 101 include autonomous, semi-autonomous, or highly assisted driving vehicles that are capable of sensing their environment and navigating within a travel network without driver or occupant input using a variety of sensors 103. The sensors 103 also capable of sensing parameters or characteristics related to the roadway, environment, vehicle dynamics, etc. that can be used to detect or report road events (e.g., slippery road events). The vehicles 101 also have the capability to report detected incident/road events and/or related sensor data to the mapping platform 109 in real-time or near real-time for detection of false positive slippery road events according to various embodiments described herein. In one embodiment, the vehicles 101 also have the capability to disable or enable autonomous driving functions in response to detected road events. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

- Level 0 (No-Automation)—"The driver is in complete and sole control of the primary vehicle controls—brake, steering, throttle, and motive power—at all times.";
- Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";
- Level 2 (Combined Function Automation)—"This level involves automation of at least two primary control functions designed to work in unison to relieve the driver of control of those functions. An example of combined functions enabling a Level 2 system is adaptive cruise control in combination with lane centering.";
- Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and
- Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

In one embodiment, the various embodiments described herein are applicable to vehicles 101 that are classified in any of the levels of automation (levels 0-4) discussed above. By way of example, the sensors 103 may include any vehicle sensor known in the art including, but not limited to, a Lidar sensor, Radar sensor, infrared sensor, global positioning sensor for gathering location data (e.g., GPS), inertial measurement unit (IMU), network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data about a roadway, an audio recorder for gathering audio data, velocity sensors mounted on steering wheels of the vehicles, vehicle-to-vehicle communication devices or sensors, switch sensors for determining whether one or more vehicle switches are engaged, and the like.

Other examples of the sensors 103 may include light sensors, orientation sensors augmented with height sensors and acceleration sensor (e.g., an accelerometer can measure acceleration and can be used to determine orientation of the vehicle), tilt sensors to detect the degree of incline or decline (e.g., slope) of the vehicle along a path of travel, moisture sensors, pressure sensors, etc. In a further example embodiment, sensors about the perimeter of the vehicle 101 may detect the relative distance of the vehicle from a lane or roadway, the presence of other vehicles, pedestrians, traffic lights, potholes and any other objects, or a combination thereof. In one scenario, the sensors may detect slippery road events, weather data, traffic information, or a combination thereof. In yet another embodiment, the sensors can determine the status of various control elements of the car, such as activation of wipers, use of a brake pedal, use of an acceleration pedal, angle of the steering wheel, activation of hazard lights, activation of head lights, etc. In one embodiment, the sensor data can be collected by and/or retrieved from an on-board diagnostic (OBD) or other vehicle telemetry system of the vehicle 101 through an interface or port (e.g., an OBD II interface or equivalent). Any combination of these sensors can be used to detect and report road events such as slippery road events.

In one embodiment, the slippery road reports can be supplemented with additional information from network-based services such as those provided by a services platform 111 and services 113 for detecting false positive slippery road events. By way of example, the services 113 can include weather services, mapping services, navigation services, and/or other data services that provide data for sensing and/or reporting road events such as slippery road events based on road-vehicle friction change associated with a road segment or area of interest. In one embodiment, the services platform 111 and/or the services 113 interact with content providers 125a-125k (also collectively referred to as content providers 125) that provide content data (e.g., weather data, incident reports, vehicle sensor data, mapping data, imaging data, etc.) to the mapping platform 109, services platform 111, and/or the services 113.

By way of example, the client terminal 115 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a client terminal 115 can support any type of interface to the user (such as "wearable" circuitry, etc.). In addition, the terminal 115 may facilitate various input means for receiving and generating information, including, but not restricted to, a touch screen capability, a keyboard and keypad data entry, a voice-based input mechanism, and the like. Any known and future implementations of the client terminal 115 may also be applicable. In one embodiment, the client terminal 115 can be an embedded component of the vehicle 101 to provide communications capabilities, navigation services, road event sensing and reporting, and/or other related services (e.g., by executing an application 123).

In one embodiment, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the mapping platform 109 can interact with the services platform 111 to receive data for detecting false positive slippery road events. By way of example, the services platform 111 may include one or more services 113 for providing weather data (e.g., the weather database 121) used by the system 100 according to various embodiment described herein. The services platform 111 and/or the services 113 can also provide related services such as provisioning services, application services, storage services, mapping services, navigation services, contextual information determination services, location-based services, information-based services (e.g., weather), etc. In one embodiment, the services platform 111 may include or be associated with the road event database 117, the geographic database 119, and/or the weather database 121.

By way of example, the vehicle 101, mapping platform 109, the services platform 111, and client terminal 115 communicate with each other and other components of the system 100 over the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
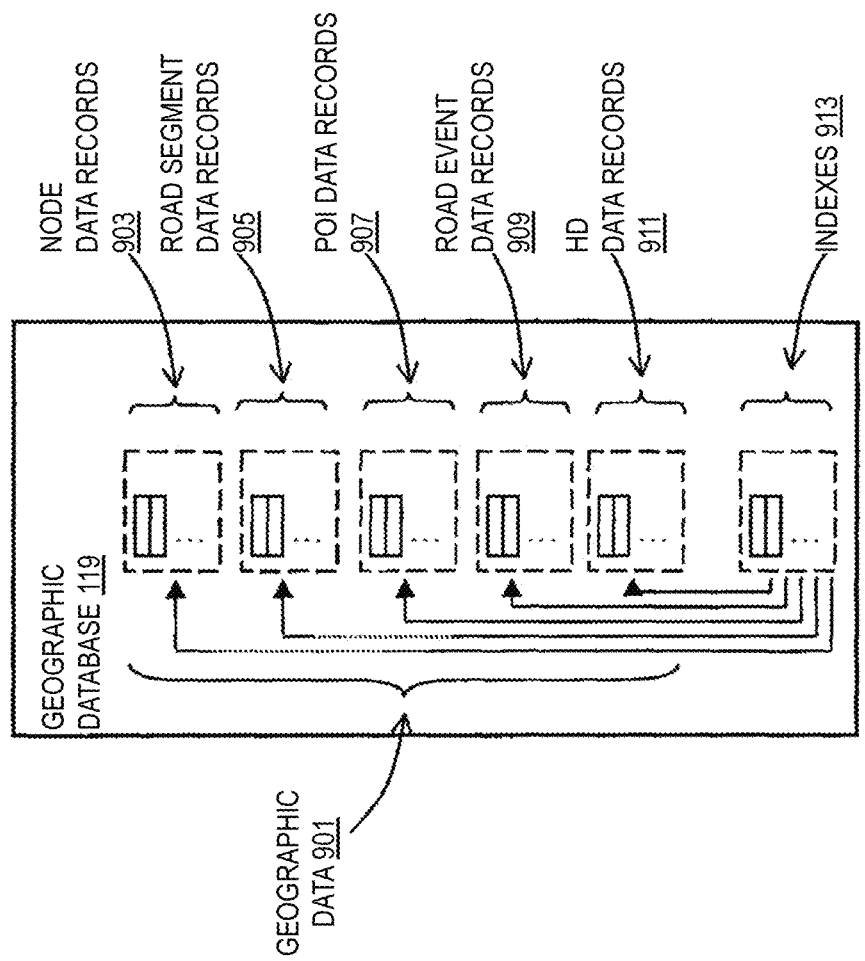
FIG. 9 is a diagram of a geographic database, according to one embodiment.

FIG. 9 is a diagram of a geographic database 119, according to one embodiment. In one embodiment, the geographic database 119 includes geographic data 901 used for (or configured to be compiled to be used for) mapping and/or navigation-related services, such map matching against reported slippery road events and for storing data records associating road event messages (e.g., slippery event messages) to geographic features such as road segments or map tiles represented in the geographic database 119. In one embodiment, the geographic database 119 include high definition (HD) mapping data that provide centimeter-level or better accuracy of map features. For example, the geographic database 119 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 119.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 119 follows certain conventions. For example, links do not cross themselves and do not cross each other except at a node. Also, there are no duplicated shape points, nodes, or links. Two links that connect each other have a common node. In the geographic database 119, overlapping geographic features are represented by overlapping polygons. When polygons overlap, the boundary of one polygon crosses the boundary of the other polygon. In the geographic database 119, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 119 includes node data records 903, road segment or link data records 905, POI data records 907, road event data records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 119. In one embodiment, the indexes 913 may be used to quickly locate data without having to search every row in the geographic database 119 every time it is accessed.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles 101, cars, and/or other entities. Alternatively, the geographic database 119 can contain path segment and node data records or other data that represent pedestrian paths or areas in addition to or instead of the vehicle road record data, for example. In one embodiment, road event data records 909 can be associated with any of the node data records 903 and/or road segment data 905 to indicate that a road event (e.g., a slippery road event) has been detected or reported at a confidence level meeting a configurable threshold for a road segment or area of interest corresponding to the associated node data records 903 and/or road segment records 905.

In addition to road events, the road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 can include data about the POIs and their respective locations in the POI data records 907. The geographic database 119 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 119 can include road event data records 909 containing slippery road reports and/or their corresponding classification as false positives or not false positives (or true positives), and/or other related data used in the various embodiments described above. In addition, the road event data records 909 can include user configuration information, driver behavior data or links to driver behavior, thresholds, map features identified for false positive classification, and/or the like for configuring or tuning the false positive detection processes according to the various embodiments described herein. In one embodiment, the road event data records 909 may be associated as attributes of any of the records 903-907 and 911 of the geographic database 119. In this way, for instance, the road event data records 909 may then be accessed and/or presented via user interfaces of end user devices (e.g., vehicle 101, client terminal 115, etc.) as part of a local hazard warning system or other mapping data pipeline. In addition or alternatively, the road event data records 909 may be stored in the road event database 117.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources). In one embodiment, the road event data records 909 (e.g., including the calculated confidence levels of reported road events) can be associated with the HD mapping data records 911 so that road events and their confidence levels can be localized to the centimeter-level of accuracy of the HD mapping data records 911.

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time road event data, traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like. In one embodiment, these sensor data can be used to report road events and their associated confidence levels determined according to the various embodiments described herein.

In one embodiment, the geographic database 119 can be maintained by the content provider 125 in association with the services platform 111 (e.g., a map developer). The map developer can collect geographic data to generate and enhance the geographic database 119. There can be different ways used by the map developer to collect data. These ways can include obtaining data from other sources, such as municipalities or respective geographic authorities. In addition, the map developer can employ field personnel to travel by vehicle (e.g., vehicle 101 and/or client terminal 115) along roads throughout the geographic region to observe features and/or record information about them, for example. Also, remote sensing, such as aerial or satellite photography, can be used.

The geographic database 119 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

In one embodiment, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or client terminal 115, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 119 can be a master geographic database, but in alternate embodiments, the geographic database 1119 can represent a compiled navigation database that can be used in or with end user devices (e.g., vehicle 101, client terminal 115, etc.) to provide navigation-related functions. For example, the geographic database 119 can be used with the end user device to provide an end user with navigation features including road event alerts. In such a case, the geographic database 119 can be downloaded or stored on the end user device (e.g., vehicle 101, client terminal 115, etc.) or the end user device can access the geographic database 119 through a wireless or wired connection (such as via a server and/or the communication network 107), for example. Furthermore, the geographic database 119 or compiled features thereof can be provided as a cloud service.

In one embodiment, the geographic database 119 is presented according to a hierarchical or multi-level tile projection. More specifically, in one embodiment, the geographic database 119 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached. As previously described, the road event data records 909 can be associated with any of the map tiles to indicate that a road event has been detected in the geographic area represented by the map tile.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grids. Because of the numbering system, the exact position of any tile in any level of the map tile grid or projection may be uniquely determined from the tile ID.

In one embodiment, the geographic database 119 may identify a tile by a quadkey determined based on the tile ID of a tile of the map tile grid. The quadkey, for example, is a one dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one dimensional array of the quadkey. In another example, the length of the one dimensional array of the quadkey may indicate the corresponding level within the map tile grid. In one embodiment, the quadkey is an example of the hash or encoding scheme of the respective geographical coordinates of a geographical data point that can be used to identify a tile in which the geographical data point is located.

In one embodiment, the end user device can be an in-vehicle navigation system, an autonomous vehicle control system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., client terminal 115) can be a cellular or mobile telephone. An end user can use the device navigation functions such as guidance and map display, for example, and for determination of route information to at least one identified point of interest, according to exemplary embodiments.

The processes described herein for providing classifying false positive slippery road reports using mapping data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
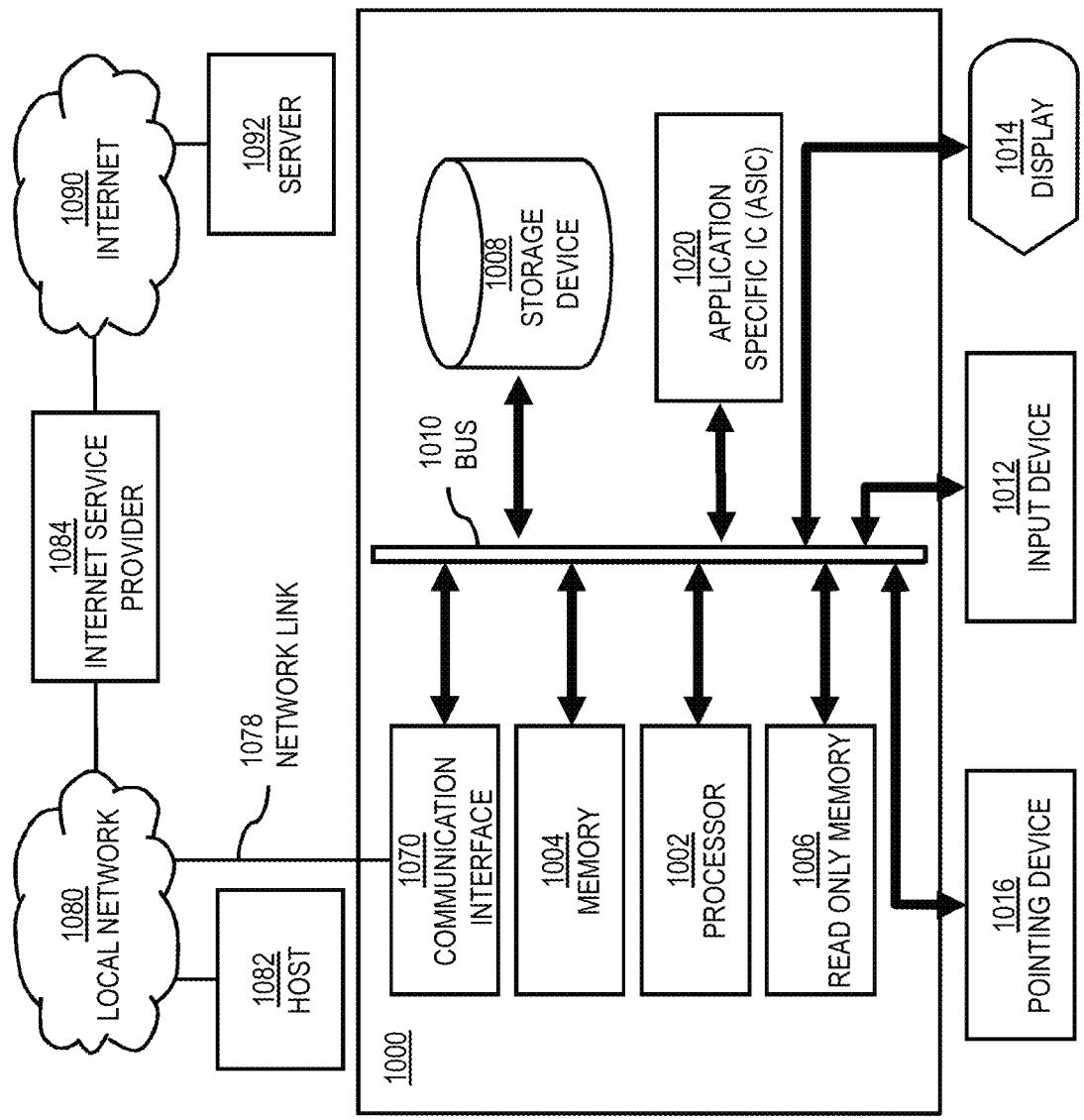
FIG. 10 is a diagram of hardware that can be used to implement an embodiment of the invention, according to one embodiment.

FIG. 10 illustrates a computer system 1000 upon which an embodiment of the invention may be implemented. Computer system 1000 is programmed (e.g., via computer program code or instructions) to classify false positive slippery road reports using mapping data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to classifying false positive slippery road reports using mapping data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for classifying false positive slippery road reports using mapping data. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for classifying false positive slippery road reports using mapping data, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for classifying false positive slippery road reports using mapping data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to classify false positive slippery road reports using mapping data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to classify false positive slippery road reports using mapping data. The memory 1105 also stores the data associated with or generated by the execution of the inventive steps.

Figure 12:
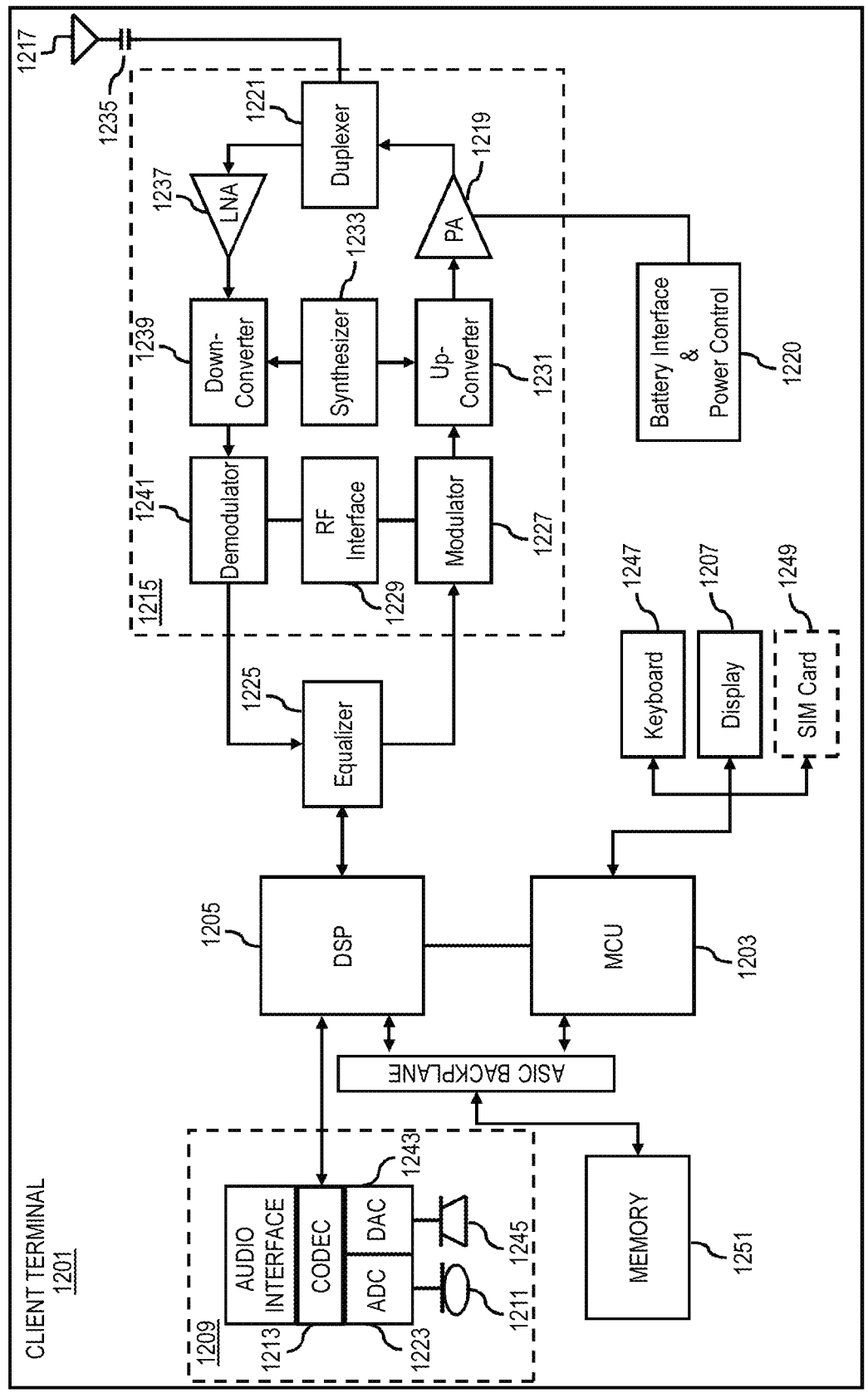
FIG. 12 is a diagram of a mobile terminal (e.g., handset or vehicle or part thereof) that can be used to implement an embodiment.

FIG. 12 is a diagram of exemplary components of a client terminal 1201 (like device 115 or vehicle 101 or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to classify false positive slippery road reports using mapping data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
receiving a plurality of slippery road reports from one or more vehicles, wherein the plurality of slippery road reports indicate that slippery road events are detected at one or more locations based on sensor information collected by one or more sensors of the one or more vehicles;
determining geographic coordinates for the one or more locations indicating the slippery road events;
determining mapping data corresponding to the determined geographic coordinates;
determining that the mapping data specifies a map feature indicating where the one or more vehicles are expected to brake or accelerate within the one or more locations;
determining that the map feature further specifies that driver behavior is a factor in the plurality of slippery road reports; and
classifying one or more of the plurality of slippery road reports as a false positive report based on proximity to the map feature.

2. The method of claim 1, wherein the map feature comprises an intersection, a curve, a ramp, a junction, or a combination thereof.

3. The method of claim 1, further comprising:
determining weather data records for the plurality of slippery road reports,
wherein the classification is further based on the weather data records.

4. The method of claim 1, further comprising:
processing sensor data associated with the plurality of slippery road reports to determine a vehicle speed; and
determining a speed limit corresponding to the map feature
wherein the classification is further based on the vehicle speed and the speed limit.

5. The method of claim 1, further comprising:
maintaining historical record of the driving behavior data for the map feature.

6. The method of claim 1, further comprising:
configuring, via a graphical user interface, criteria for determining the proximity.

7. The method of claim 1, further comprising:
configuring a distance threshold for the proximity; and
determining that the map feature corresponds to a non-navigable road segment based on the distance threshold,
wherein the classification as the false positive report is based on the determination that the map feature corresponds to the non-navigable road segment.

8. The method of claim 3, further comprising:
retrieving the weather data records from a source independent from the one or more vehicles, wherein the classification as the false positive report is solely based on the weather data records indicating that a road segment corresponding to the map feature is dry.

9. The method of claim 1, further comprising:
receiving historical driver behavior data corresponding to the driver behavior, wherein the driver behavior data indicates braking or accelerating within the proximity to the map feature; and
determining that the one or more vehicles has excessively accelerated or decelerated based on the historical driver behavior data.

10. The method of claim 9, further comprising:
receiving road data specifying low friction condition of a road segment associated with the map feature, wherein the determination that the one or more vehicles has excessively accelerated or decelerated is further based on the road data.

11. An apparatus comprising:
at least one processor; and
at least one memory including computer program code for one or more programs,
the at least one memory and the computer program code configured to, with the at least one processor, cause the apparatus to perform at least the following,
receive a plurality of slippery road reports from one or more vehicles, wherein the plurality of slippery road reports indicate that slippery road events are detected at one or more locations based on sensor information collected by one or more sensors of the one or more vehicles;
determine geographic coordinates for the one or more locations indicating the slippery road events;
determine mapping data corresponding to the determined geographic coordinates;
determine that the mapping data specifies a map feature indicating where the one or more vehicles are expected to brake or accelerate within the one or more locations;
determine that the map feature further specifies that driver behavior is a factor in the plurality of slippery road reports; and
classify one or more of the plurality of slippery road reports as a false positive report based on proximity to the map feature.

12. The apparatus of claim 11, wherein the map feature comprises an intersection, a curve, a ramp, a junction, or a combination thereof.

13. The apparatus of claim 11, wherein the apparatus is further caused to:

process sensor data associated with the plurality of slippery road reports determine a vehicle speed; and
determine a speed limit corresponding to the map feature, wherein the classification is further based on the vehicle speed and the speed limit.

14. A non-transitory computer-readable storage medium, carrying one or more sequences of one or more instructions which, when executed by one or more processors, cause an apparatus to perform:
   receiving a plurality of slippery road reports from one or more vehicles indicating that slippery road events are detected at one or more locations based on sensor information collected by one or more sensors of the one or more vehicles;
   determining geographic coordinates for the one or more locations indicating the slippery road events;
   determining mapping data corresponding to the determined geographic coordinates;
   determining that the mapping data specifies a map feature indicating where the one or more vehicles are expected to brake or accelerate within the one or more locations;
   determining that the map feature further specifies that driver behavior is a factor in the plurality of slippery road reports; and
   classifying one or more of the plurality of slippery road reports as a false positive report based on proximity to the map feature.

15. The non-transitory computer-readable storage medium of claim 14, wherein the map feature includes an intersection, a curve, a ramp, a junction, or a combination thereof.

16. The non-transitory computer-readable storage medium of claim 14, wherein the driver behavior is based on historical driver behavior data that is associated with a population of drivers or an individual driver.

17. The non-transitory computer-readable storage medium of claim 14, wherein the apparatus is further caused to perform:
   processing sensor data associated with the plurality of slippery road reports to determine a vehicle speed; and
   determining a speed limit corresponding to the map feature,
   wherein the classification is further based on the vehicle speed and the speed limit.

18. The method of claim 1, further comprising:
   presenting, via a graphical user interface, the driving behavior data including an individualized driver behavior data or a general population driver behavior data to users of the one or more vehicles for user selection; and
   configuring false positive detection parameters based on the selection.

19. The method of claim 18, wherein the individualized driver behavior data comprises behavior of an individual driver, and wherein the general population driver behavior data comprises behavior of a group of drivers with similar characteristics, similar vehicle types, or a combination thereof.

20. The apparatus of claim 11, wherein the apparatus is further caused to:
   present, via a graphical user interface, the driving behavior data including an individualized driver behavior data or a general population driver behavior data to users of the one or more vehicles for user selection; and
   configure false positive detection parameters based on the selection.

* * * * *